US006328487B1

(12) United States Patent
Cartoni

(10) Patent No.: US 6,328,487 B1
(45) Date of Patent: Dec. 11, 2001

(54) VERTICAL PLANE COUNTERBALANCING STRUCTURE, PARTICULARLY FOR SUPPORT HEADS FOR TELEVISION OR MOTION PICTURE CAMERAS

(75) Inventor: Guido Cartoni, Rome (IT)

(73) Assignee: Cartoni S.p.A., Rome (IT)

( * ) Notice: Subject to any disclaimer, the term of this patent is extended or adjusted under 35 U.S.C. 154(b) by 0 days.

(21) Appl. No.: 09/352,885

(22) Filed: Jul. 14, 1999

(30) Foreign Application Priority Data

Jul. 29, 1998 (IT) .............................................. RM98A0506

(51) Int. Cl.[7] ...................................................... G03B 17/00
(52) U.S. Cl. .................. 396/428; 248/123.11; 248/372.1
(58) Field of Search ....................... 396/428; 248/123.11, 248/372.1, 371, 398

(56) References Cited

U.S. PATENT DOCUMENTS 4,208,028 * 6/1980 Brown et al. ......................... 396/421
5,360,196 * 11/1994 DiGiulio et al. ..................... 396/421

* cited by examiner

Primary Examiner—David M. Gray
(74) Attorney, Agent, or Firm—Smith, Gambrell & Russell LLP

(57) ABSTRACT

A vertical plane counter-balancing structure for a camera includes a device for fixing a camera, a support, a first pulley system including first and second pulleys, an elastic device, a first rope or cable connected between the elastic device and the support over the first pulley, and a second rope or cable connected between the elastic device and the support over the second pulley. The first and second pulleys have axes that are offset from one another and that are movable in a vertical direction. The first rope or cable compresses the elastic device when the support inclines at an angle between 0 and −90° with respect to the vertical direction, and the second rope or cable compresses the elastic device when the support inclines at an angle between 0 and +90° with respect to the vertical direction. A pair of fixed pulleys (i.e., a third pulley and a fourth pulley) can be provided between the elastic device and support such that the first rope or cable winds around the third pulley and the second rope or cable winds around the fourth pulley.

9 Claims, 2 Drawing Sheets

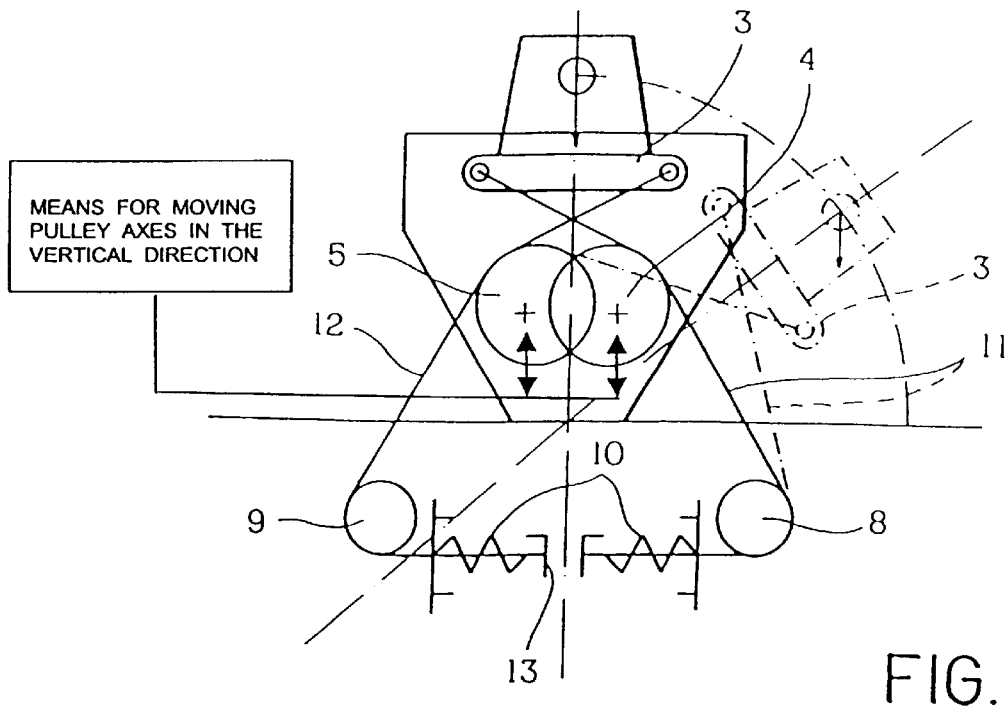
FIG. 1
FIG. 2
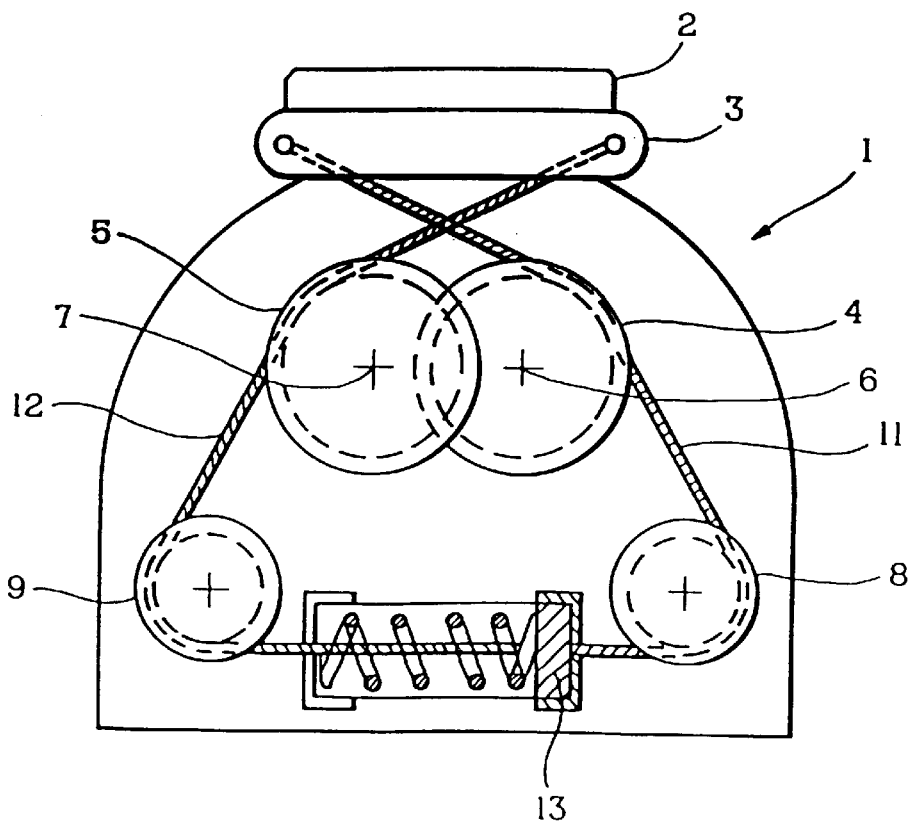

VERTICAL PLANE COUNTERBALANCING STRUCTURE, PARTICULARLY FOR SUPPORT HEADS FOR TELEVISION OR MOTION PICTURE CAMERAS

BACKGROUND OF THE INVENTION

The present invention relates to a vertical plane counterbalancing structure, particularly for support heads for television or motion picture cameras.

As is well known, in fluid heads for camera supports, balancing the camera weight is necessary both on the horizontal plane and the vertical plane.

No difficulty exists in obtaining balance on the horizontal plane, since the weight of the camera is supported by a high efficiency system, generally comprised of a ball thrust bearing having a suitable diameter.

However, the problem relevant to balancing on the vertical plane is different, since the angular displacement of the camera causes a turning over moment, or an "acting agent", which varies based on the angular displacement.

In order to obtain the same conditions as in the horizontal plane, the acting moment must be annulled by an opposite or "reagent" moment, having the same and opposite value all along the −90°/+90° motion arc.

In other words, the barycenter of the system (camera plus head) varies in any angular situation, so that it is practically impossible to obtain a perfect and constant balancing throughout the arc of motion.

The importance of an optimum balancing in any position along the 180° arc (−90°/+90°) is very high since it remarkably influences the quality of the film or video being shot.

At present, known counterbalance solutions do not provide a complete solution to the above problem along the whole arc of motion.

SUMMARY OF THE INVENTION

One objective of the present invention is to solve the above mentioned problems, providing a structure able to guarantee the balancing of the camera system (support head-camera) at any position along the use arc on the horizontal plane, as well as on the vertical plane.

These and other results are obtained according to the present invention by a counter-balancing technical solution that creates a reacting moment equal and opposite to the instantaneous acting moment, i.e., to the moment that must be considered as a variable, and at the same time allowing one to mount cameras having different weights. The system according to the present invention also is provided with adjustment means, allowing it to fit to different loads.

It is therefore a specific object of the present invention to provide a vertical plane counter-balancing structure, particularly for support heads for television or motion picture cameras, comprising means to fix the camera, a support for the fixing means, a first movable pulley system, the pulleys having offset and vertically movable rotation axes, an elastic means group, and at least two ropes or cables fixed, at one end, to the elastic means group, and at the other end to the support, the ropes or cables each passing on one of the pulleys of the first pulley system, the two ropes or cables alternatively acting by compressing the elastic means group, respectively when the load coupled with the fixing means is inclined with respect to the vertical at an angle between 0° and +90° and between 0° and −90°.

Preferably, according to the invention, a pair of fixed pulleys is provided, along the ropes, between the elastic means group and the first movable pulley system.

Still according to the invention, the elastic means group provides at least a spiral spring.

Preferably, two groups of spiral springs are provided, each one comprising at least a spiral spring, the relevant rope being coupled with the spring in such a way to stress the same under compression.

Furthermore, according to a preferred embodiment of the counter-balancing structure according to the invention, the elastic means group is provided vertically.

Still according to the invention, the movable pulleys have their axes offset a fixed value along the horizontal plane.

In an embodiment of the structure according to the invention, a single elastic means group is provided, the ropes or cables being both coupled on the same side of the elastic means group.

Preferably, the at least one elastic means group is removably housed within a housing element.

According to the invention, the ropes or cables are made of steel.

BRIEF DESCRIPTION OF THE DRAWINGS

The present invention will now be described, for illustrative but not limitative purposes, according to its preferred embodiments, with particular reference to the enclosed drawings, wherein:

FIG. 1 shows a working scheme of a counter-balancing structure according to the present invention;

FIG. 2 schematically shows a first embodiment of a counter-balancing structure according to the present invention.

DETAILED DESCRIPTION OF THE INVENTION

Figure 3:
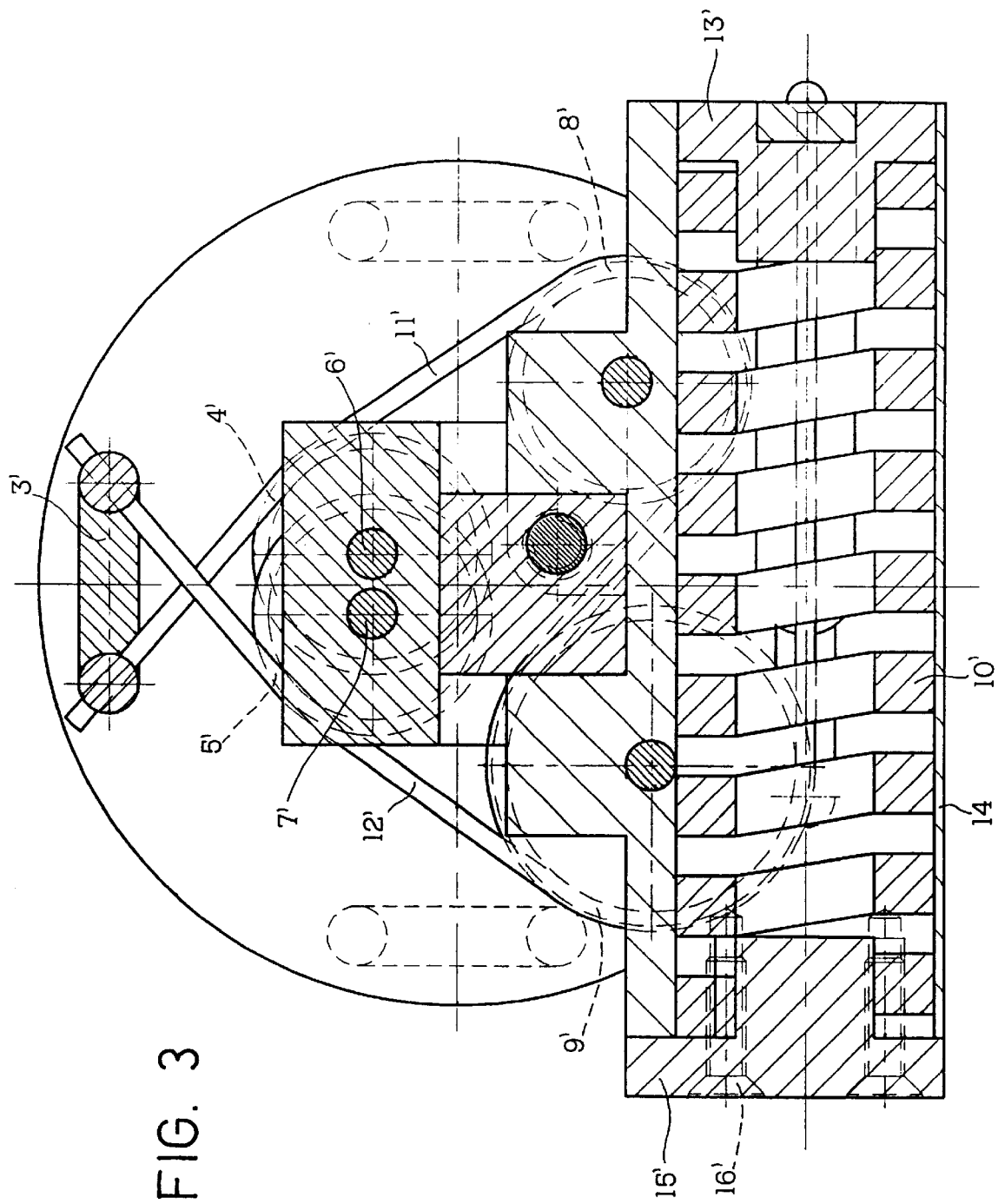
FIG. 3 schematically shows a second embodiment of a counter-balancing structure according to the present invention.

In the following, a counter-balancing structure for a support head for television or motion picture cameras will be described. As is evident, however, this same structure can be used in different cases, and therefore, this specific example cannot be used to unduly limit the present invention.

Observing now FIGS. 1 and 2 of the enclosed drawings, a counter-balancing structure according to the present invention is shown.

In the embodiment shown, the counter-balancing structure 1 provides a slide 2 onto which a cinecamera (not shown) may be fixed, and a support element 3, provided below the slide 2.

Below the element 3, a pair of upper pulleys 4, 5 is provided, the pulleys being offset from each other with respect to their respective axes 6, 7, and vertically movable in such a way to allow adjustment of the acting moment, as will be described in greater detail in the following.

Furthermore, two lower fixed pulleys 8, 9 and two precompressed spiral springs 10 are provided, their compression being a further adjustment means for the counter-balancing structure according to the invention.

Two steel ropes 11, 12 are coupled, at one end, to one of the two spiral springs 10, on the inner plate 13, in such a way to stress the spring under compression, and, at the other end, to the element 3. Each one of the steel ropes 11, 12 passes through its respective lower pulley 8, 9 and through its respective upper pulley 4, 5.

In the counter-balancing structure 1 according to the invention, the reacting moment is obtained by the spiral springs 10 which are compressed by the ropes 11, 12 acting on the plates 13. The springs 10 work under alternate compression, respectively between 0° and +90° and between 0° and −90°.

In the embodiment of the invention shown in FIGS. 1 and 2, to limit the dimensions, springs 10 are horizontally provided, although they could be provided at a different orientation.

Ropes 11, 12, upper movable pulleys 4, 5, and lower fixed pulleys 8, 9 transform the rotary motion of the barycenter on the vertical plane into linear motion on the horizontal plane.

As is well known, the compression diagram of a generic spiral spring 10 is almost linear, and only toward the spring 10 closure point will an increased load on the spring 10 move away from the linear behavior.

Obviously, the diagram of the acting moment between 0° and 90° and the diagram of the reacting moment may vary, depending on the kind of spring used. In order to obtain the result on which the present invention is based, it is necessary that, in order to not disturb the fluid motion of the head by external forces, the two curves of the acting moment and of the reacting moment overlap all along the −90°/+90° arc.

This result is obtained by misalignment of the two pulleys 4, 5 of a constant x value, in such a way to vary the inclination of the ropes transmitting the reacting moment.

The difference of inclination determines a difference of values in the forces parallelogram, determining an increase of the reacting force in a vertical direction and a reduction of the same in the horizontal direction. The reduction along the +/−90° arc flattens the curve of the acting moment, making it almost overlap with the curve of the reacting moment along the −90°/+90° arc.

Summarizing, the counterbalancing of the counterbalancing structure 1 according to the invention is based on the concept that the agent moment generated by the weight force of the cinecamera (not shown)—slide 2—rotating elements 4, 5, 11, 12 assembly must be counterbalanced in any position by a reacting moment having the same value and opposite direction.

Particularly, it occurs in the whole rotation arc −90°/+90° with respect to the vertical axis, in such a way to allow complete panning shots along the 180° arc (azimuthal plane).

In the counter-balancing structure 1, the counterbalancing force is obtained by the springs 10, subjected to compression in a horizontal direction and connected, by the steel ropes 11, 12 and the pulleys 4, 5, 8, 9, with the element rotating about the horizontal axis.

The basis of the principle of the counter-balancing structure 1 according to the invention is its geometry, i.e., the distances of the pulleys 4, 5, 8, 9 with respect to the rotation axis, both on the horizontal and vertical planes, and with respect to the fixing point of the ropes 11, 12 to the cinecamera (not shown)—slide 2—rotating elements 4, 5, 11, 12 assembly.

The variation of intensity of the balancing system is obtained by the movement along the vertical axis of the pulleys 4, 5, which so modifies the precompression level of the springs 10 and the geometry of the system, varying the relation between weight force of the cinecamera (not shown)—slide 2—rotating elements 4, 5, 11, 12 assembly (acting force) and the one exerted by the springs 10 (reacting force).

Thus, it is an adjustment which allows the system to fit to different loads (cinecameras having a different weight). As already said, the adjustment occurs by displacement of the movable pulleys 4, 5 along the vertical axis; the displacement induces a slight precompression of the springs 10, useful to maintain the system in an equilibrium condition without any motion along the vertical plane, and prepares the system to provide a growing reacting moment (on the basis of the linear characteristic of the spring 10), when moving along the 180° arc.

Coming now to observe FIG. 3, a second embodiment of the structure according to the invention will be described, this embodiment being substantially similar to the previous one, and therefore the same parts will be indicated by the same reference number with a prime "'" indicator.

The structure shown in this embodiment is substantially the same as the previous one, with the difference being that a single spring 10' is provided.

In this case, the steel rope 11' is sent from the pulley 8' toward the pulley 9', that in this case is double in size, and then is coupled to the spring 10' on the same side as the steel rope 12'.

In this way, the structure according to the invention can be smaller.

In the embodiment shown, the spring 10' is housed within a housing 14, frontally closed by a removable element 15', which is coupled with the housing 14 by screws 16'.

Ropes 11' and 12' are fixed on a plate 13', removably coupled rearly to the spring 10'.

In this way, it is possible to easily replace the spring 10' as needed. This solution can obviously also be provided in the previous embodiment.

In known mechanisms providing an operation based on the reaction of a spring subjected to compression forces, the variation of the power of the same mechanism is obtained by precompressing the balancing system, in order to obtain a higher reacting moment. However, in this way, spring precompression adds to the maximum compression in the extreme positions −90°/+90°, exceeding the point where the spring 10 characteristic is no longer linear, and consequently jeopardizing the equilibrium of the system.

On the contrary, adjustment of the counter-balancing structure 1 according to the present invention occurs in an indirect way, as a function of the load applied, varying the equilibrium angle of the lines of application of the forces involved, in such a way that, when it rotates −90°/+90°, the springs 10 are proportionally compressed, so that in the presence of variable loads, the behavior of the system according to the invention is completely linear, and the camera remains fixed in any position all along the 180° arc on the vertical plane.

Weight force of the cinecamera—slide—rotating elements assembly (acting force) generates the moment to be counterbalanced, and corresponds to the weight force multiplied by the distance between its application straight line and the rotation instantaneous center of the system.

Reaction force of the spring 10 generates the counterbalancing moment, corresponding to the reaction force multiplied by the distance between its application straight line and the rotation instantaneous center of the system. The instantaneous rotation center of the system is determined for any moment by the intersection of the perpendicular lines with respect to the trajectories of the application points of the involved forces and follows a trajectory varying with the rotation angle. Particularly, acting force is applied along the circumference, the center of which is the rotation center of the system and the ray of which is the distance of the same from the gravity center of the cinecamera—slide—rotating element assembly (barycenter).

Acting force that must be counterbalanced is determined by the equilibrium of the moments according to the formula:

Reacting Force×$a$=Acting Force×$b$

Wherein a and b are the arms with respect to the instantaneous rotation center, which are variable when the rotation angle varies.

Reacting force is suitably transmitted to the pulling point of the springs 10 according to the system geometry.

Force generated by the springs 10 is considered directly proportional to the compression of the same, according to the formula:

$$F=-K \times X$$

wherein K represents rigidity of the spring 10, to be considered directly applied to the pulling point of the springs from which it is generated.

In the initial equilibrium position, the system is subjected to the two precompression forces, equal and opposite, of the springs 10, realized to balance the acting moment in the rotation direction, so that during the first rotation phases while a spring 10 is charging beyond its initial precompression level, the other one discharges starting from its precompression level.

In this phase, the reacting force, and thus the level of the counterbalancing moment, is determined by the difference of the two components.

The present invention has been described for illustrative but not limitative purposes, according to its preferred embodiments, but it is to be understood that modifications and/or changes can be introduced by those skilled in the art without departing from the relevant scope as defined in the enclosed claims.

I claim:

1. A vertical plane counter-balancing structure for a television or motion picture camera, comprising:
    (a) means for fixing a camera;
    (b) a support for the means for fixing;
    (c) a first pulley system including:
        a first pulley having a first rotational axis that is movable in a vertical direction, and
        a second pulley having a second rotational axis that is movable in the vertical direction, wherein the second rotational axis is offset from the first rotational axis;
    (d) an elastic means;
    (e) a first rope or cable, wherein a first end of the first rope or cable is fixed to the elastic means and a second end of the first rope or cable is fixed to the support, wherein the first rope or cable contacts the first pulley; and
    (f) a second rope or cable, wherein a first end of the second rope or cable is fixed to the elastic means and a second end of the second rope or cable is fixed to the support, wherein the second rope or cable contacts the second pulley,
    wherein the first rope or cable compresses the elastic means when a load coupled to the means for fixing inclines at an angle between 0 and −90° with respect to the vertical direction and the second rope or cable compresses the elastic means when the load coupled to the means for fixing inclines at an angle between 0 and +90° with respect to the vertical direction.

2. The vertical plane counter-balancing structure according to claim 1, further comprising:
    a third pulley provided between the elastic means and the first pulley, wherein the first rope or cable contacts the third pulley; and
    a fourth pulley provided between the elastic means and the second pulley, wherein the second rope or cable contacts the fourth pulley.

3. The vertical plane counter-balancing structure according to claim 2, wherein the third pulley and the fourth pulley are at fixed locations with respect to one another.

4. The vertical plane counter-balancing structure according to claim 1, wherein the elastic means includes at least one spiral spring.

5. The vertical plane counter-balancing structure according to claim 1, wherein the elastic means includes:
    a first spiral spring compressible by the first rope or cable, and
    a second spiral spring compressible by the second rope or cable.

6. The vertical plane counter-balancing structure according to claim 1, wherein, when the support is not inclined with respect to the vertical direction, the first rotational axis of the first pulley and the second rotational axis of the second pulley lie on a horizontal plane.

7. The vertical plane counter-balancing structure according to claim 1, wherein the first rope or cable is made of steel and the second rope or cable is made of steel.

8. The vertical plane counter-balancing structure according to claim 1, wherein the elastic means includes one spring, and wherein the first rope or cable is coupled to a first side of the elastic means and the second rope or cable is coupled to the first side of the elastic means.

9. The vertical plane counter-balancing structure according to claim 1, further comprising a housing element for removably housing the elastic means.

* * * * *